(12) United States Patent
Wang et al.

(10) Patent No.: US 12,148,941 B1
(45) Date of Patent: Nov. 19, 2024

(54) BATTERY MODULE AND BATTERY PACK

(71) Applicant: Jinko Energy Storage Technology Co., Ltd., Zhejiang (CN)

(72) Inventors: Qinyun Wang, Zhejiang (CN); Yunhui Gao, Zhejiang (CN); Ke Chen, Zhejiang (CN); Shengyi Chen, Zhejiang (CN); Chao Zuo, Zhejiang (CN)

(73) Assignee: Jinko Energy Storage Technology Co., Ltd., Haining (CN)

( * ) Notice: Subject to any disclaimer, the term of this patent is extended or adjusted under 35 U.S.C. 154(b) by 0 days.

(21) Appl. No.: 18/480,397

(22) Filed: Oct. 3, 2023

(30) Foreign Application Priority Data

May 18, 2023 (CN) .......................... 202321238497.1

(51) Int. Cl.
*H01M 50/24* (2021.01)
*H01M 50/204* (2021.01)
*H01M 50/502* (2021.01)

(52) U.S. Cl.
CPC ......... *H01M 50/24* (2021.01); *H01M 50/204* (2021.01); *H01M 50/502* (2021.01)

(58) Field of Classification Search
CPC ... H01M 50/24; H01M 50/204; H01M 50/502
See application file for complete search history.

(56) References Cited

U.S. PATENT DOCUMENTS

| | | | |
|---|---|---|---|
| 2018/0062226 A1* | 3/2018 | Raiser | H01M 10/613 |
| 2021/0050635 A1* | 2/2021 | Lee | H01M 50/271 |
| 2021/0305546 A1* | 9/2021 | Chang | H01M 50/204 |
| 2022/0009360 A1* | 1/2022 | Hendriks | H01M 50/20 |
| 2023/0155243 A1* | 5/2023 | Lee | H01M 50/258 |
| | | | 429/87 |

FOREIGN PATENT DOCUMENTS

| | | | | |
|---|---|---|---|---|
| CN | 211 828 929 U | 10/2020 | | |
| CN | 213 483 832 U | 6/2021 | | |
| CN | 214 313 451 U | 9/2021 | | |
| CN | 113611948 | * 11/2021 | ......... | H01M 10/613 |
| CN | 115064809 | * 9/2022 | ........... | H01M 50/24 |
| EP | 3 958 388 A1 | 2/2022 | | |
| JP | 2013118160 A | 6/2013 | | |
| JP | 2014220157 A | 11/2014 | | |
| JP | 2022146852 A | 10/2022 | | |
| JP | 2023508369 A | 3/2023 | | |

OTHER PUBLICATIONS

Machine English translation of CN 115064809 (Year: 2022).*
CN 113611948 machine English translation (Year: 2021).*
Extended European Search Report dated of corresponding European Patent Application No. 23209397.1 issued on Apr. 16, 2024 in 6 pages.
Japanese Office Action for Application No. 2023-179435, mailed Oct. 1, 2024 (8 pages).

* cited by examiner

*Primary Examiner* — Michael L Dignan
(74) *Attorney, Agent, or Firm* — Knobbe, Martens, Olson & Bear, LLP

(57) ABSTRACT

A battery module includes a plurality of cells and a first fireproof layer. The cells are arranged in sequence. The first fireproof layer is arranged on the plurality of cells. The first fireproof layer is attached to top surfaces of the cells. A battery pack includes at least two battery modules stacked vertically.

19 Claims, 5 Drawing Sheets

BATTERY MODULE AND BATTERY PACK

CROSS-REFERENCE TO RELATED APPLICATION

The present application claims priority to Chinese Patent Application No. 202321238497.1, filed on May 18, 2023, the content of which is incorporated herein by reference in its entirety.

TECHNICAL FIELD

The present disclosure relates to the technical field of batteries, and in particular, to a battery module and a battery pack.

BACKGROUND

A battery module includes a plurality of cells, which are connected in series or in parallel. Since the cells in the battery module are arranged compactly, once thermal runaway occurs in a cell, heat is easily transferred to other cells, causing thermal runaway of other cells, which leads to chain thermal runaway. Eventually, the entire battery module may catch fire or even explode, seriously affecting the usage safety of the battery module.

SUMMARY

The present disclosure provides a battery module and a battery pack.

According to one aspect, a battery module is provided. The battery module includes: a plurality of cells and a first fireproof layer. The cells are arranged in sequence, and the first fireproof layer is arranged on the cells. The first fireproof layer is attached to top surfaces of the cells.

According to another aspect, a battery pack is provided. The battery pack includes at least two battery modules stacked vertically. The battery module includes: a plurality of cells and a first fireproof layer. The cells are arranged in sequence, and the first fireproof layer is arranged on the cells. The first fireproof layer is attached to top surfaces of the cells.

It should be understood that the general description above and the detailed description in the following are merely exemplary and illustrative, and cannot limit the present disclosure.

REFERENCE SIGNS

1: cell;
11: pole;
2: first fireproof layer;
21: through hole;
3: second fireproof layer;
4: third fireproof layer;
5: end plate;
6: side plate;
7: busbar member;
8: top cover;
9: heating sheet.

The accompanying drawings herein, which are incorporated in and constitute a part of this specification, illustrate embodiments consistent with the present disclosure and, together with the specification, serve to explain principles of the present disclosure.

DESCRIPTION OF EMBODIMENTS

In order to make the objectives, technical solutions, and advantages of the present disclosure clearer, the present disclosure is described in further detail below with reference to the accompanying drawings and embodiments. It should be understood that specific embodiments described herein are intended only to interpret the present disclosure and not intended to limit the present disclosure.

In the description of the present disclosure, unless otherwise clearly stated and limited, the terms "first" and "second" are used for descriptive purposes only, which cannot be construed as indicating or implying a relative importance. Unless otherwise specified or stated, the term "a plurality of" means two or more. The terms "connection" and "fixing" should be understood in abroad sense. For example, "connection" may be a fixed connection, a detachable connection, or an integral connection; or an electrical connection; or a direct connection or an indirect connection through an intermediate medium. For those of ordinary skill in the art, the specific meanings of the foregoing terms in the present disclosure can be understood on a case-by-case basis.

In the description of the present disclosure, it is to be understood that orientation terms such as "up" and "down" described in the embodiments of the present disclosure are described from the perspective shown in the accompanying drawings, and should not be construed as limiting the embodiments of the present disclosure. Besides, in this context, it is to be further understood that one element described as being connected "on" or "under" another element not only means that the element may be directly connected "on" or "under" the another element, but also means that the element may be indirectly connected "on" or "under" the another element through an intermediate element.

Figure 1:
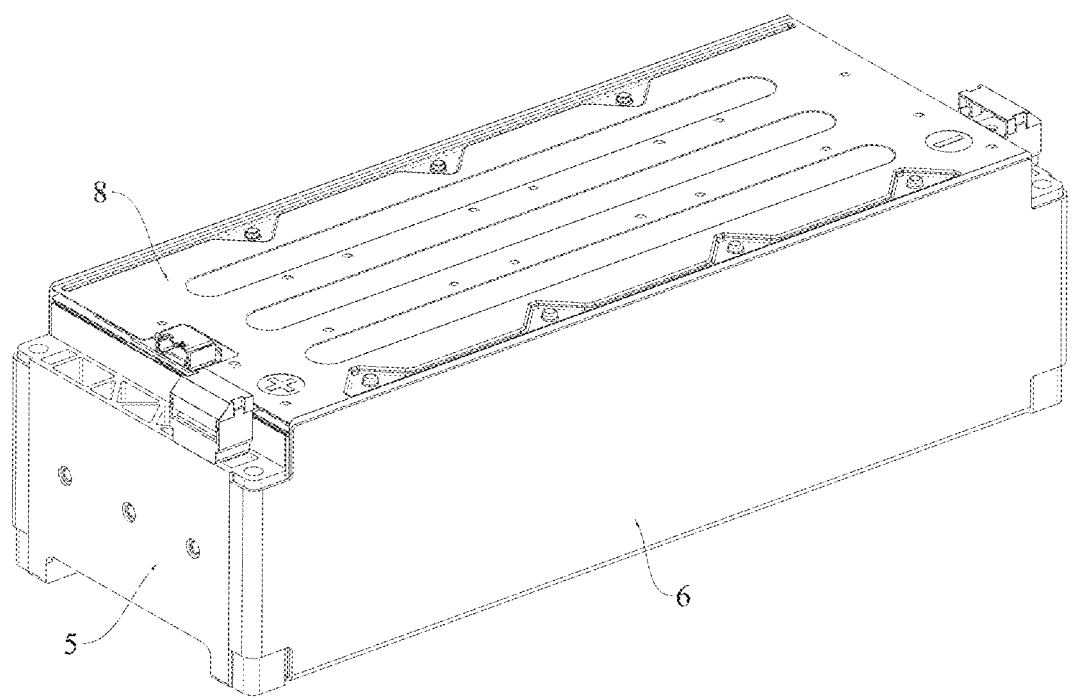
FIG. 1 is a schematic structural diagram of a battery module according to some embodiments of the present disclosure.
Figure 2:
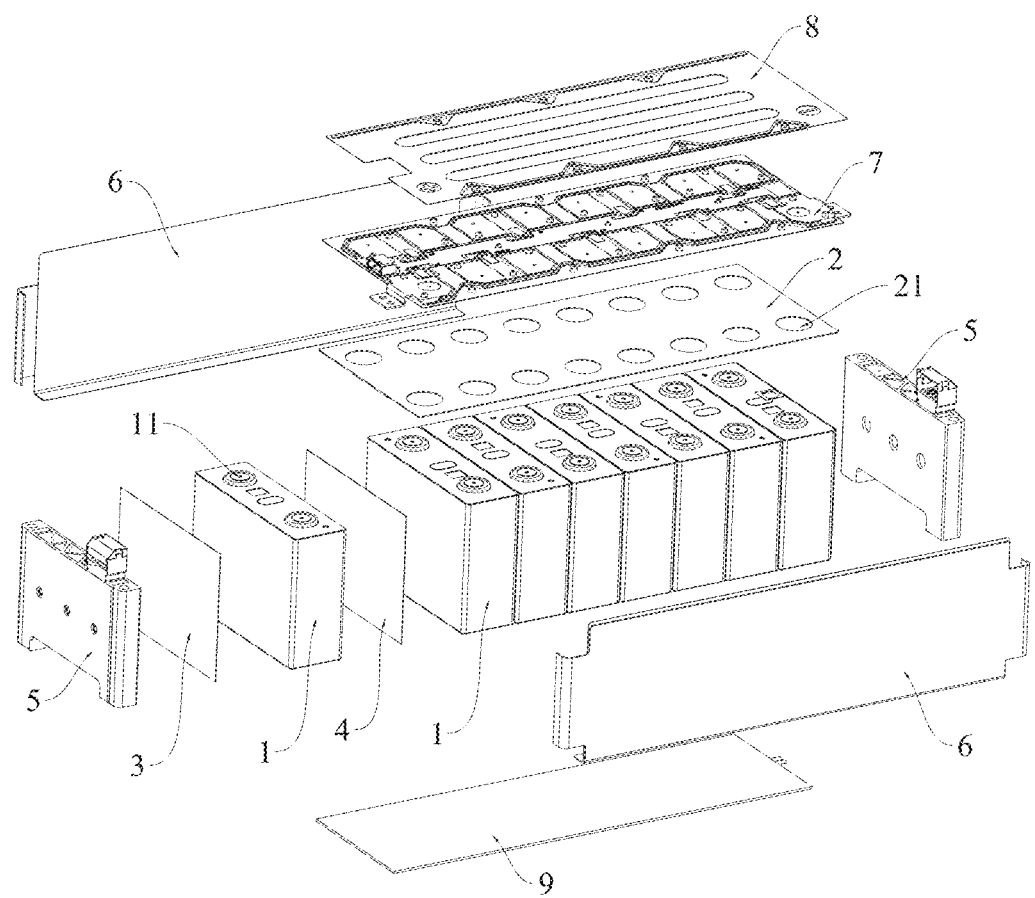
FIG. 2 is an exploded diagram of the battery module shown in FIG. 1.
Figure 3:
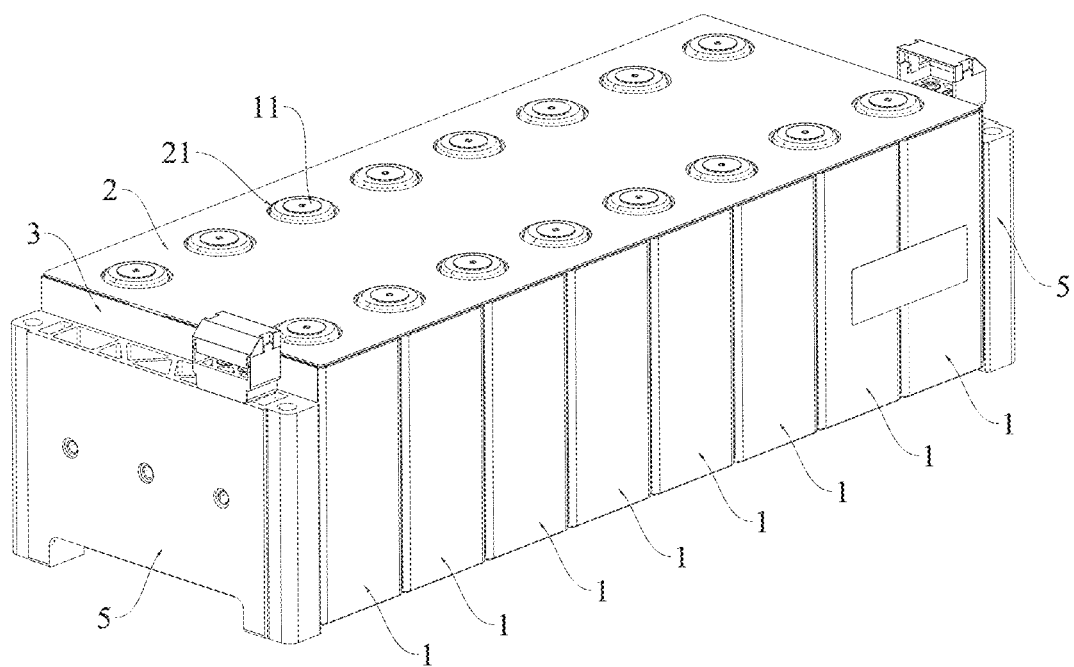
FIG. 3 is a schematic structural diagram of a part of the battery module shown in FIG. 1.
Figure 4:
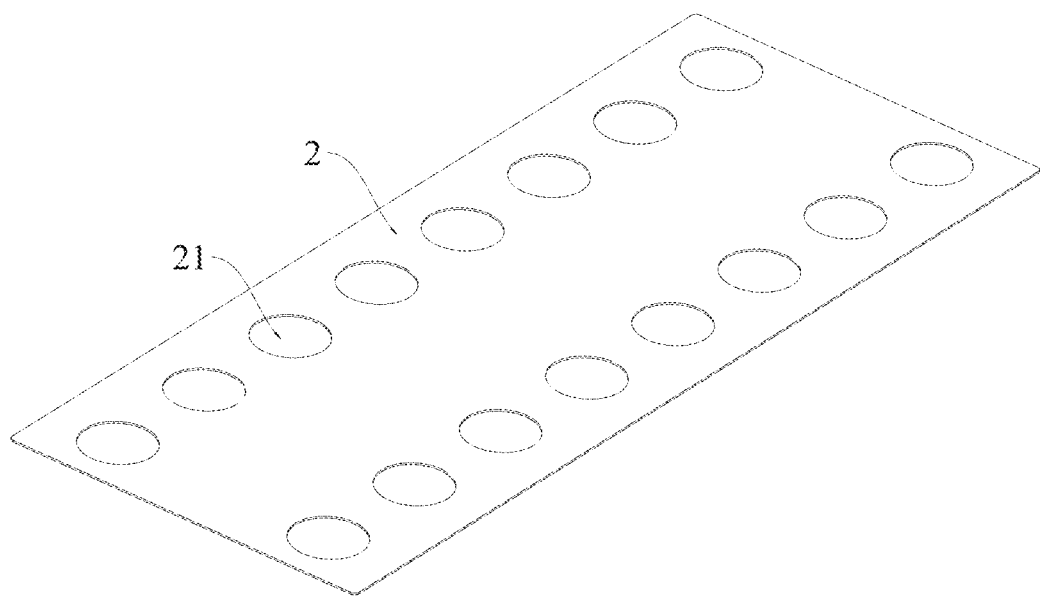
FIG. 4 is a schematic structural diagram of a first fireproof layer in FIG. 3.
Figure 5:
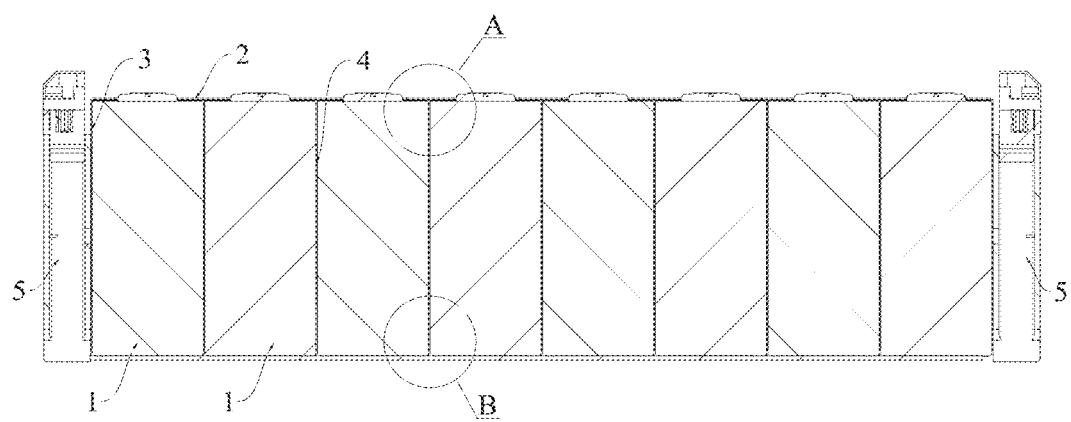
FIG. 5 is a cross-sectional view of the battery module of FIG. 3.

As shown in FIG. 1 to FIG. 2, embodiments of the present disclosure provide a battery module, including a plurality of cells 1, two end plates 5, two side plates 6, a busbar member 7, and a top cover 8. The plurality of cells 1 are arranged in sequence. For example, the plurality of cells 1 may be arranged in sequence along an own thickness direction. The end plates 5 are arranged at two ends of the cells 1 along an arrangement direction of the cells 1, and the side plates 6 are connected to the two end plates 5, so that the end plates 5 and the side plates 6 jointly form a fixed frame surrounding the cells 1. The busbar member is arranged over the cells 1 and connected to poles 11 of the cells 1, so as to realize series and parallel connections between the cells 1. The top cover 8 covers the busbar member to form the top of the battery module. A heating sheet 9 may be further arranged at the bottom of the battery module, to heat the battery module in a low temperature environment.

As shown in FIG. 2 to FIG. 7, in some embodiments, the battery module provided further includes a first fireproof layer 2. The first fireproof layer 2 is arranged on the cells 1. For example, the first fireproof layer 2 is attached to top surfaces of the cells 1. That is, the first fireproof layer 2 is in direct contact with the top surfaces of the cells 1. There are no other components between the first fireproof layer 2 and the top surfaces of the cells 1, and the busbar member 7 and the top cover 8 are all arranged over the first fireproof layer 2. The first fireproof layer 2 is arranged on the top of the cells 1 and the first fireproof layer 2 is attached to the top surfaces of the cells 1, so that the first fireproof layer 2 plays a role of fireproof and heat insulation on the top of the cells 1, which can effectively prevent spreading of fire to regions other than the cells 1 and delay spreading of the fire between the cells 1, thereby preventing thermal runaway of the entire battery module. That is, the first fireproof layer 2 can block longitudinal spreading of the fire, and the fire cannot pass through the first fireproof layer 2 and reach the busbar member 7 and the top cover 8 over the first fireproof layer 2, thereby reducing damages to the battery module. The first fireproof layer 2 can delay lateral spreading of the fire. When thermal runaway occurs in one cell 1, the heat is difficult to spread laterally on the top of the cell 1, thereby preventing spreading of the fire to other cells 1 and preventing thermal runaway of the entire battery module.

As shown in FIG. 2 to FIG. 5, for example, a surface of the first fireproof layer 2 is arranged in a planar structure, which can simplify the structure of the first fireproof layer 2 and reduce manufacturing costs, and can also prevent interference of the first fireproof layer 2 with other parts (such as the busbar member 7) of the battery module and improve versatility of the first fireproof layer 2.

The first fireproof layer 2 may be arranged as a continuous fireproof region covering multiple cells 1 at the same time, or arranged as a plurality of independent fireproof layers. For example, each cell 1 is provided with a separate first fireproof layer 2. The first fireproof layer 2 may cover only part of the top surfaces of the cells 1, or may cover the entire top surfaces of the cells 1. As long as the first fireproof layer 2 can play a role of heat insulation on the top surfaces of the cells 1, a risk of thermal runaway of the battery module can be reduced.

In some embodiments, the first fireproof layer 2 extends to edges of the cells 1 along the arrangement direction of the cells 1 and extends to the edges of the cells 1 along the length direction of the cells, so as to form a continuous fireproof region at the top of the cells 1, which effectively improves a fireproof and heat insulation effect and reduces a risk of thermal runaway of the battery module. Edges of the first fireproof layer 2 do not exceed the edges of the cell 1, so as to prevent the edge of the first fireproof layer 2 from hanging in the air, which may cause breakage of the edge of the first fireproof layer 2 and affect the fireproof and heat insulation effect.

Further, the first fireproof layer 2 is provided with through holes 21, and poles 11 of the cells 1 extend through the through holes 21 and protrude with respect to a surface of the first fireproof layer 2, so that connection of the cells 1 is realized over the first fireproof layer 2, so as to minimize an influence of the fire on components other than the cells 1, thereby reducing the risk of thermal runaway of the battery module. In addition, pressure can be released through the through holes 21 of the first fireproof layer 2, preventing explosion of the cells 1 due to thermal runaway.

Further, the first fireproof layer 2 is bonded to the top surface of the cell 1, so that a tight connection is formed between the first fireproof layer 2 and the top surface of the cell 1, so as to prevent relative movement of the first fireproof layer 2 and the cell 1 or a large gap between the first fireproof layer 2 and the cell 1, which may reduce the fireproof effect.

For example, the first fireproof layer 2 is formed in a sheet structure including one or more layers made of one or more heat insulating materials. For example, the heat insulating materials include any one or more of polyimide resin, phenolic resin, epoxy resin, alumina, zirconia, boehmite (AlOOH), gibbsite (Al(OH)$_3$), silicon oxide, magnesia, calcium oxide, titania, barium titanate, alumina-silica composite oxide, aluminum nitride, boron nitride, silicon, diamond, barium sulfate, calcium fluoride, barium fluoride, kaolin, montmorillonite, bentonite, and feldspar. The first fireproof layer 2 may be arranged as a single-layer structure or a multi-layer structure.

In some embodiments, the first fireproof layer 2 includes a mica sheet, which uses a natural mineral product as a raw material, has a low manufacturing cost, and has no pollution during manufacturing. Moreover, the mica sheet has good electrical properties, good heat resistance, stable chemical properties, good mechanical properties, and is not easily damaged by the thermal runaway.

As shown in FIG. 2 to FIG. 5, a second fireproof layer 3 is arranged between the cell 1 and the end plate 5, and the second fireproof layer 3 provides fireproof and heat insulation at an end portion of the cell 1, which prevents the fire from spreading to regions other than the cell, thereby reducing the damages to the battery module.

Further, two sides of the second fireproof layer 3 are bonded to surfaces of the end plate 5 and the cell 1 respectively, so that the end plate 5 and the cell 1 form an entirety. In this way, an overall size of the battery module is reduced, and energy density of the battery module is improved.

For example, the second fireproof layer 3 may be formed in a sheet structure made of a heat insulating material. For example, the heat insulating material includes any one or more of polyimide resin, phenolic resin, epoxy resin, alumina, zirconia, boehmite (AlOOH), gibbsite (Al(OH)$_3$), silicon oxide, magnesia, calcium oxide, titania, barium titanate, alumina-silica composite oxide, aluminum nitride, boron nitride, silicon, diamond, barium sulfate, calcium fluoride, barium fluoride, kaolin, montmorillonite, bentonite, and feldspar. The second fireproof layer 3 may be arranged as a single-layer structure or a multi-layer structure. A third fireproof layer 4 may be arranged as a single-layer structure or a multi-layer structure.

In some embodiments, the second fireproof layer 3 includes a mica sheet, which uses a natural mineral product as a raw material, has a low manufacturing cost, and has no pollution during manufacturing. Moreover, the mica sheet has good electrical properties, good heat resistance, stable chemical properties, good mechanical properties, and is not easily damaged by thermal runaway.

In some embodiments, the second fireproof layer 3 further includes an insulating layer. A material of the insulating layer includes, but is not limited to, Polycarbonate (PC), ceramics, polypropylene (PP), nylon, or the like. The insulating layer is bonded to a surface of the mica sheet to improve an insulation effect between the cells 1, thereby improving safety performance of the battery module.

In some embodiments, third fireproof layers 4 are arranged between adjacent cells 1. Two adjacent cells 1 are separated from each other by the third fireproof layer 4, which can effectively prevent the fire from spreading to adjacent cells 1 and limit thermal runaway within a range of a single cell 1, thereby preventing thermal runaway of the entire battery module.

Figure 6:
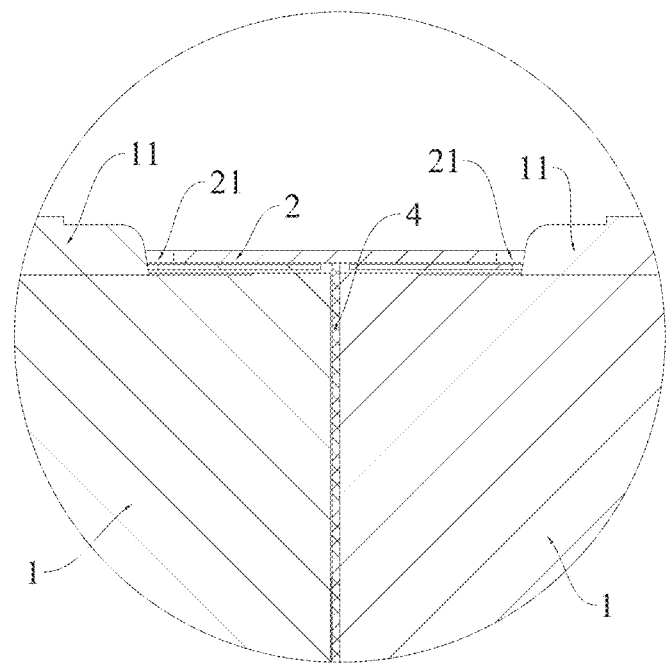
FIG. 6 is a partial enlarged view of a region A in FIG. 5.

As shown in FIG. 6, in some embodiments, upper ends of the third fireproof layers 4 are in contact with a lower surface of the first fireproof layer 2, so that the third fireproof layers 4 and the first fireproof layer 2 jointly form a plurality of separate fireproof and heat insulation spaces. Each fireproof and heat insulation space accommodates one cell 1, and adjacent fireproof and heat insulation spaces are not communicated with each other, so as to limit thermal runaway within the fireproof and heat insulation space, thereby preventing thermal runaway of the entire battery module.

Figure 7:
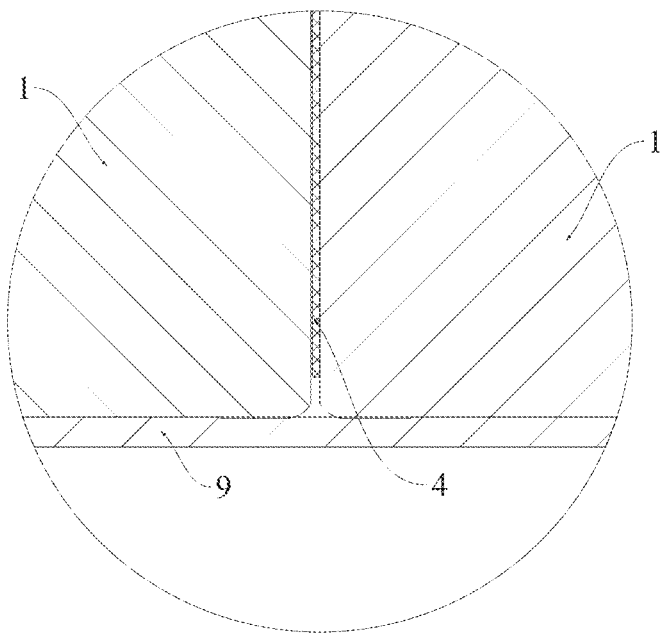
FIG. 7 is a partial enlarged view of a region B in FIG. 5.

As shown in FIG. 7, in some embodiments, the lower ends of the third fireproof layers 4 do not exceed lower ends of the cells 1. In other words, the lower end of the third fireproof layer 4 is aligned with the lower end of the cell 1, or the lower end of the third fireproof layer 4 is higher than the lower end of the cell 1. For example, there is a gap between the lower end of the third fireproof layer 4 and the lower end of the cell 1. On the one hand, since high-temperature smoke generated by the fire generally flows upwards, the fire spreads upwards quickly, and the fire is less likely to spread downwards. The small gap at the lower end of the cell 1 may not affect the overall fireproof effect and can also reduce a weight and save a cost. On the other hand, the gap between the lower end of the third fireproof layer 4 and the lower end of the cell 1 can prevent the third fireproof layer 4 from being in contact with a support plane at the bottom, so as to ensure that the third fireproof layer 4 does not bear any load during transportation or use of the battery module and prevent damages to the third fireproof layer 4.

Further, two sides of the second fireproof layer 4 are bonded to surfaces of the adjacent cells 1 respectively, so that the cells 1 are connected to each other to form an entirety. In this way, the interval between the adjacent cells 1 is reduced, an overall size of the battery module is reduced, and energy density of the battery module is improved.

For the material and structure of the third fireproof layer 4, reference can be made to those of the second fireproof layer 3. The third fireproof layer 4 and the second fireproof layer 3 may use same material and structure or different materials and structures.

In addition, embodiments of the present disclosure further provide a battery pack, including battery modules provided in the above embodiments of the present disclosure. The battery pack includes at least two battery modules. For example, the battery pack includes a plurality of the battery modules stacked vertically. When thermal runaway occurs in one battery module in the battery pack, the first fireproof layer 2 in the battery module can effectively prevent upward transfer of the fire, thereby preventing the fire from spreading to other battery modules.

The above descriptions are only preferred embodiments of the present disclosure, and are not intended to limit the present disclosure. For those skilled in the art, various modifications and changes may be made to the present disclosure. Any modifications, equivalent replacements, improvements, and the like made within the spirit and the principle of the present disclosure shall fall within the protection scope of the present disclosure.

What is claimed is:

1. A battery module, comprising:
   a plurality of cells arranged in sequence;
   a first fireproof layer arranged on the plurality of cells and attached to a top surface of each of the plurality of cells;
   a pair of end plates and a pair of second fireproof layers;
   a plurality of third fireproof layers arranged between adjacent cells of the plurality of cells;
   a heating sheet arranged below and in direct contact with the plurality of cells, wherein the heating sheet is configured to heat the plurality of cells; and
   a first side plate and a second side plate,
   wherein the first fireproof layer comprises a plurality of through holes, each of the plurality of cells corresponding to two of the plurality of through holes,
   wherein each of the plurality of cells comprises two poles extending through the corresponding two of the plurality of through holes to protrude from a surface of the first fireproof layer,
   wherein the top surface of each of the plurality of cells, excluding the two poles, is entirely covered by the first fireproof layer,
   wherein the pair of end plates are arranged on two ends of the plurality of cells, and the pair of second fireproof layers are arranged on the two ends between the plurality of cells and a corresponding end plate of the pair of end plates,
   wherein the pair of second fireproof layers and the plurality of third fireproof layers are made of different materials,
   wherein the first side plate and the second side plate are connected to the pair of end plates,
   wherein the first side plate covers a first surface of the plurality of cells and the second side plate covers a second surface of the plurality of cells, and
   wherein no fireproof layer is arranged between the first side plate and the first surface of each of the plurality of cells, and no fireproof layer is arranged between the second side plate and the second surface of each of the plurality of cells.

2. The battery module according to claim 1, wherein the first fireproof layer comprises a mica sheet.

3. The battery module according to claim 1, further comprising a busbar member on the first fireproof layer and a top cover on the busbar member.

4. The battery module according to claim 1, wherein a first side of each of the pair of second fireproof layers is bonded to the corresponding end plate of the pair of end plates and wherein a second side of each of the pair of second fireproof layers is bonded to the plurality of cells.

5. The battery module according to claim 1, wherein the pair of second fireproof layers comprises a mica sheet.

6. The battery module according to claim 1, wherein an upper end of each of the plurality of third fireproof layers is in contact with a lower surface of the first fireproof layer.

7. The battery module according to claim 1, wherein a lower end of each of the plurality of third fireproof layers does not exceed a lower end of each of the plurality of cells.

8. The battery module according to claim 1, wherein opposite sides of each of the plurality of third fireproof layers are bonded to respective surfaces of the adjacent cells of the plurality of cells.

9. The battery module according to claim 1, wherein an upper end of each of the plurality of third fireproof layers is in contact with a lower surface of the first fireproof layer.

10. The battery module according to claim 1, wherein a lower end of each of the plurality of third fireproof layers does not exceed a lower end of each of the plurality of cells.

11. The battery module according to claim 1, wherein opposite sides of each of the plurality of third fireproof layers are bonded to respective surfaces of the adjacent cells of the plurality of cells.

12. The battery module according to claim 1, wherein each of the pair of second fireproof layers comprises a mica sheet, and each side of the mica sheet is provided with an insulating layer.

13. The battery module according to claim 12, wherein the insulating layer comprises polycarbonate ceramics, polypropylene, or nylon.

14. The battery module according to claim 1, wherein the first fireproof layer comprises a plurality of first fireproof portions spaced apart from each other, and each of the plurality of first fireproof portions is arranged on a corresponding one of the plurality of cells.

15. The battery module according to claim 1, wherein the first fireproof layer comprise a flat surface.

16. The battery module according to claim 1, wherein the first fireproof layer comprises a plurality of sub-layers, wherein layers of the plurality of sub-layers are made of different materials.

17. The battery module according to claim 1, wherein the pair of second fireproof layers are single layers, and the plurality of third fireproof layers comprise a plurality of sub-layers.

18. A battery pack, comprising at least two battery modules stacked vertically, wherein a battery module of the at least two battery modules comprises:
 a plurality of cells arranged in sequence;
 a first fireproof layer arranged on the plurality of cells and attached to a top surface of each of the plurality of cells;
 a pair of end plates and a pair of second fireproof layers;
 a plurality of third fireproof layers arranged between adjacent cells of the plurality of cells;
 a heating sheet arranged below and in direct contact with the plurality of cells, wherein the heating sheet is configured to heat the plurality of cells; and
 a first side plate and a second side plate,
 wherein the first fireproof layer comprises a plurality of through holes, each of the plurality of cells corresponding to two of the plurality of through holes,
 wherein each of the plurality of cells comprises two poles extending through the corresponding two of the plurality of through holes to protrude from a surface of the first fireproof layer,
 wherein the top surface of each of the plurality of cells, excluding the two poles, is entirely covered by the first fireproof layer,
 wherein the pair of end plates are arranged on two ends of the plurality of cells, and the pair of second fireproof layers are arranged on the two ends between the plurality of cells and a corresponding end plate of the pair of end plates,
 wherein the pair of second fireproof layers and the plurality of third fireproof layers are made of different materials,
 wherein the first side plate and the second side plate are connected to the pair of end plates,
 wherein the first side plate covers a first surface of the plurality of cells and the second side plate covers a second surface of the plurality of cells, and
 wherein no fireproof layer is arranged between the first side plate and the first surface of each of the plurality of cells, and no fireproof layer is arranged between the second side plate and the second surface of each of the plurality of cells.

19. The battery pack according to claim 18, wherein a first side of each of the pair of second fireproof layers is bonded to the corresponding end plate of the pair of end plates, and wherein a second side of each of the pair of second fireproof layers is bonded to the plurality of cells.

* * * * *